US009347185B2

(12) United States Patent
Reda (10) Patent No.: US 9,347,185 B2
(45) Date of Patent: May 24, 2016

(54) METHOD AND APPARATUS FOR SCANNING AND REPAIRING ROAD DAMAGE (71) Applicant: Shaker Ahmed Reda, Akron, OH (US)

(72) Inventor: Shaker Ahmed Reda, Akron, OH (US)

(*) Notice: Subject to any disclaimer, the term of this patent is extended or adjusted under 35 U.S.C. 154(b) by 0 days.

(21) Appl. No.: 14/820,226

(22) Filed: Aug. 6, 2015

(65) Prior Publication Data
US 2016/0032540 A1 Feb. 4, 2016

Related U.S. Application Data (63) Continuation-in-part of application No. 14/447,080, filed on Jul. 30, 2014.

(51) Int. Cl.
| E01C 19/00 | (2006.01) |
| G05D 1/00 | (2006.01) |
| E01C 19/18 | (2006.01) |
| E01C 19/22 | (2006.01) |

(52) U.S. Cl.
CPC .............. *E01C 19/004* (2013.01); *E01C 19/185* (2013.01); *E01C 19/22* (2013.01); *G05D 1/0011* (2013.01)

(58) Field of Classification Search
CPC ....... E01C 7/00; E01C 11/005; E01C 19/004; E01C 19/185; E01C 23/07; G05D 1/001
USPC ..................... 404/75, 84.05–84.8, 90–94, 97, 404/101–105, 107–111, 117, 118, 122, 128
See application file for complete search history.

(56) References Cited

U.S. PATENT DOCUMENTS

| 5,251,999 | A | * | 10/1993 | McCracken | ............ E01C 23/06 404/109 |
| 5,584,597 | A | * | 12/1996 | Lemelson | ................ E01C 23/07 299/41.1 |
| 5,746,539 | A | * | 5/1998 | Mara | ........................ E01C 23/07 404/102 |
| 6,161,986 | A | * | 12/2000 | Smith | .................... E01C 19/201 222/52 |
| 6,846,128 | B2 | * | 1/2005 | Sick | ........................ E01C 19/004 404/133.05 |
| 7,033,106 | B2 | * | 4/2006 | Harvey | .................. E01C 23/098 404/107 |
| 2013/0155061 | A1 | | 6/2013 | Jahanshahi et al. | |

FOREIGN PATENT DOCUMENTS

CN              202925442 U     5/2013
WO     WO 2013/096704 A1     6/2013

OTHER PUBLICATIONS

Deon Joubert, et al., "Pothole Tagging System", http://researchspace.csir.co.za/dspace/bitstream/10204/5384/1/Joubert_2011.pdf.

* cited by examiner

*Primary Examiner* — Raymond W Addie
(74) *Attorney, Agent, or Firm* — Oblon, McClelland, Maier & Neustadt, L.L.P.

(57) ABSTRACT

An apparatus includes a multidirectional positioning system, a scanner, a filling head and a scrubbing head. The scanner scans the volume of a three-dimensional road damage, and the scanner is attached to the multidirectional positioning system. The scrubbing head prepares the surface of the three-dimensional road damage, and the scrubbing head is affixed to the multidirectional positioning system. A processor receives volume data of the three-dimensional road damage and stores the volume data in a data storage memory. The filling head is attached to the multidirectional positioning system, and the filling head is controlled to move with respect to a shape of the three-dimensional road damage based on the volume data stored in the processor so as to fill in the three-dimensional road damage with a filling material.

19 Claims, 7 Drawing Sheets

METHOD AND APPARATUS FOR SCANNING AND REPAIRING ROAD DAMAGE

CROSS-REFERENCE TO RELATED APPLICATIONS

The present application is a continuation-in-part of U.S. application Ser. No. 14/447,080 filed Jul. 30, 2014, the entire contents of which are incorporated herein by reference.

BACKGROUND

1. Technical Field

The embodiments discussed herein relate to a method and apparatus for scanning and repair of road damage. More specifically, the scanning of the road damage may be achieved using a three-dimensional scanning device.

2. Description of the Related Art

Currently, there are a few methods for repairing minor road damage, such as potholes, cracks, or other cavities in the road surface. One method involves applying filler such as asphalt to the damaged area. A vehicle is then driven over it several times until the material is compacted and smooth. Another method of repair involves a patch. For example, a minor pothole, which only impacts the surface layer, might be repaired by removing debris from the hole and then filling it with fresh asphalt. Then, the asphalt is flattened with a heavy roller. Finally, an alternative method, which is more akin to preventing further damage rather than truly repairing the damage, is surface treatment. In surface treatment, contractors may spray old roadways with a protective coating to stop fallout and prevent further crumbling. The seal is sprayed to fill minor cracks and eliminate surface defects. In some instances, the road may be treated with a chemical, which dissolves road matter to reestablish homogeneity.

With the above methods, (particularly in the case of filler and patching), the traditional process for determining the cost to repair the roadway generally involves the following steps. First, the length and width of any holes in the road surface are manually measured with a tape measure. Then, the respective depth of the holes is manually measured from the road surface with a tape measure. From these measurements, the volume of each damaged portion is calculated, and then collectively subtotaled to estimate the total amount of repair material that is needed.

Despite the simplistic appearance of the above steps, there are challenges that complicate the repair process. One challenge encountered is the size and shape of the hole. Holes do not often erode evenly or in simple shapes that would simplify volume calculations and thereby provide more precise estimates of material needs. As such, the three-dimensional measurements become more complex and accuracy is diminished. More specifically, additional measurement points are needed, which adds time and complexity. Another challenge is the skill level of and method of measurement used by the technician making the measurements.

One additional challenge, while related to the repair of the hole, does not deal with the actual repair, but is a secondary problem that occurs due to the method of the repair. This secondary problem is the large amounts of time and space required to enable the repair using the known methods, which leads to roadway congestion, as well as easily-recognizable repair related hazards and unintended consequential hazards accompanying such congestion. For example, the easily-recognizable repair related hazards include health and safety issues for both the drivers and the workers. On the other hand, unintended consequential hazards include long delays which impact the local environment via pollution and additional road surface wear and tear, as well as create an overall loss in economic productivity.

Regardless of the above challenges, once the quantity of material needed is determined, a quality contractor must be selected. However, a good quality contractor may mean an increase in cost. Moreover, if the repair is urgent, rush work may also mean additional cost.

Accordingly, the cost of even minor repairs could be significant for many aspects of the economy depending on the size, urgency, complexity, and availability of a contractor for the work.

Current suggestions for improving this procedure include using more durable paving materials, making repairs during non-rush hours, and managing repairs more closely so as to minimize the duration of road blockage for repair time. None of the suggestions, however, directly solve the problems that exist.

Therefore, as recognized by the present inventor, a need exists for a better, more efficient, and more economic method and apparatus for repairing road damage.

SUMMARY

According to an embodiment, an apparatus includes a multidirectional positioning system and a scanner. The scanner scans the volume of three-dimensional road damage, and the scanner is attached to the multidirectional positioning system. A processor receives volume data of the three-dimensional road damage and stores the volume data in a data storage memory. A material depositing mechanism is attached to the multidirectional positioning system, and the material depositing mechanism is controlled to move with respect to a shape of the road damage based on the volume data stored in the processor so as to fill in the road damage with a filler material.

According to another embodiment, a method includes positioning a scanner over a three-dimensional road damage using a multidirectional positioning system to which the scanner is attached. Next, the volume of the three-dimensional road damage is scanned by moving the scanner across the three-dimensional road damage with the multidirectional positioning system. The volume of the three-dimensional road damage as data is stored in a data storage memory of a processor. The method then calculates a quantity of filling material required to fill the three-dimensional road damage based on the volume data of the three-dimensional road damage scanned. Finally, the three-dimensional road damage is filled with the calculated quantity of filling material.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings. However, the accompanying drawings and their exemplary depictions do not in any way limit the scope of the inventions embraced by this specification. The scope of the inventions embraced by the specification and drawings are defined by the words of the accompanying claims.

DETAILED DESCRIPTION

In the following, the present advancement will be discussed by describing a preferred embodiment with reference to the accompanying drawings. However, those skilled in the art will realize other applications and modifications within the scope of the disclosure as defined in the enclosed claims.

Figure 1A:
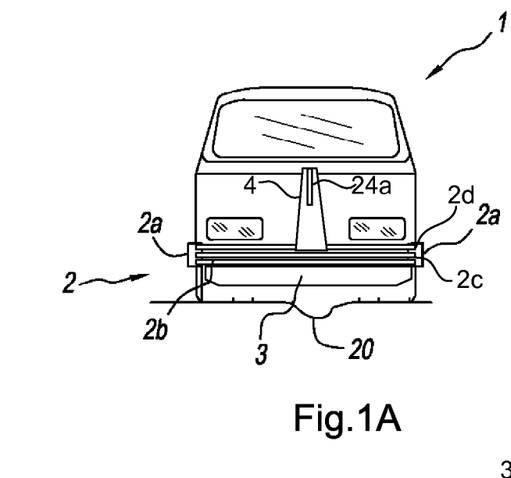
FIG. 1A is a front view drawing of an apparatus according to an exemplary embodiment of the present disclosure.
Figure 1B:
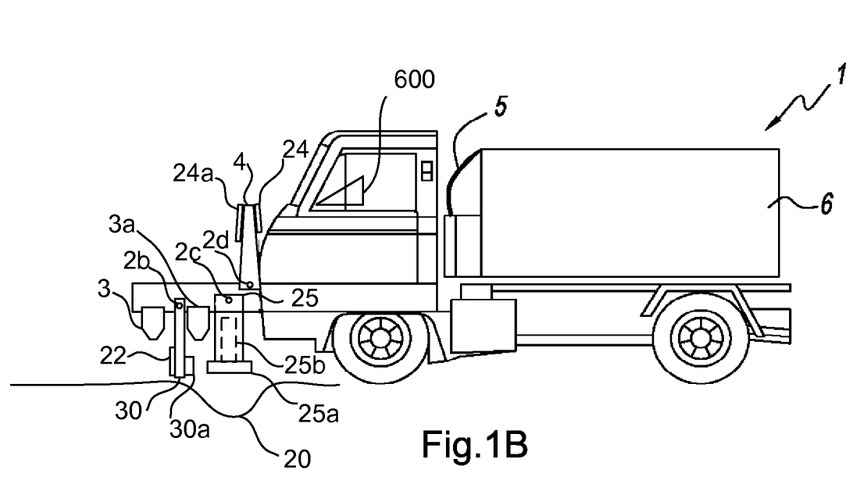
FIG. 1B is a side profile view drawing of the apparatus in FIG. 1A according to an exemplary embodiment of the present disclosure.
Figure 1C:
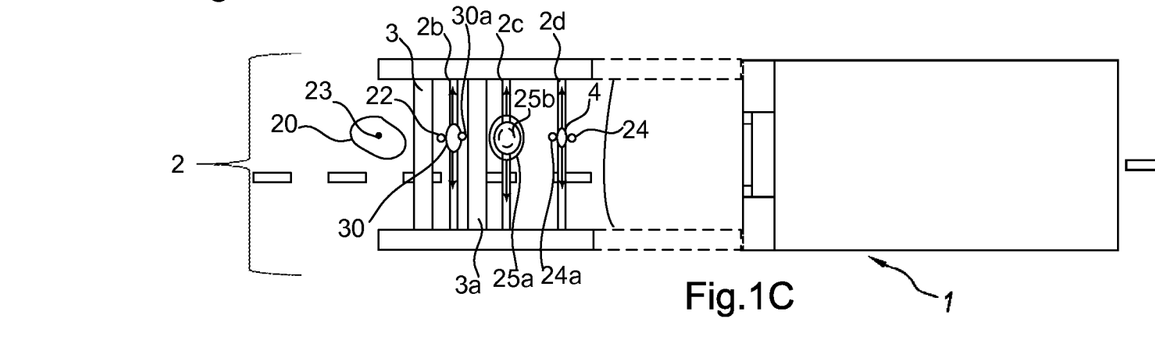
FIG. 1C is a top view drawing of the apparatus in FIG. 1A according to an exemplary embodiment of the present disclosure.
Figure 2A:
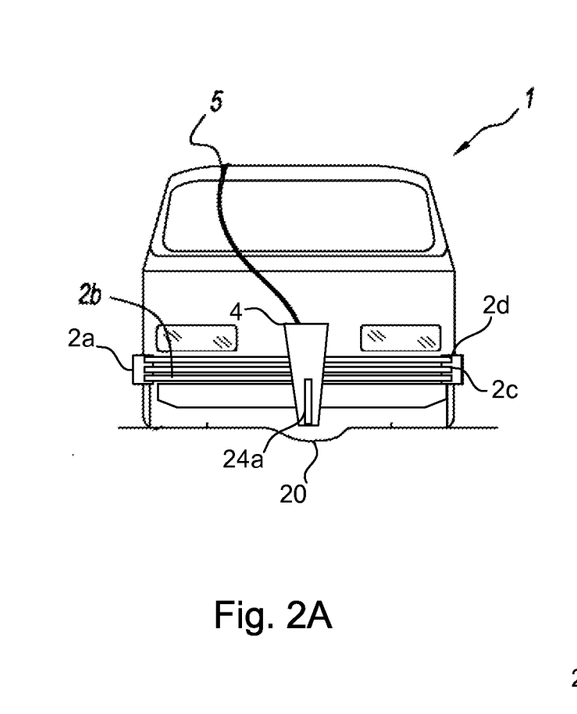
FIG. 2A is front view drawing of another aspect of the apparatus in FIG. 1A according to an exemplary embodiment of the present disclosure.
Figure 2B:
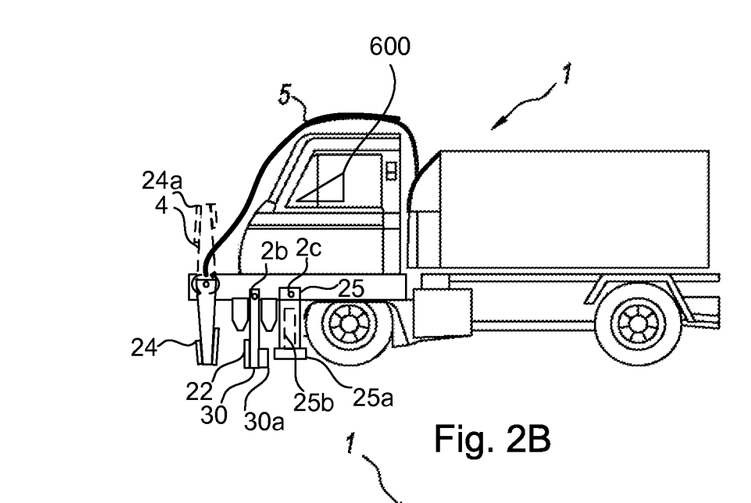
FIG. 2B is a side profile view drawing another aspect of the apparatus in FIG. 1A according to an exemplary embodiment of the present disclosure.
Figure 2C:
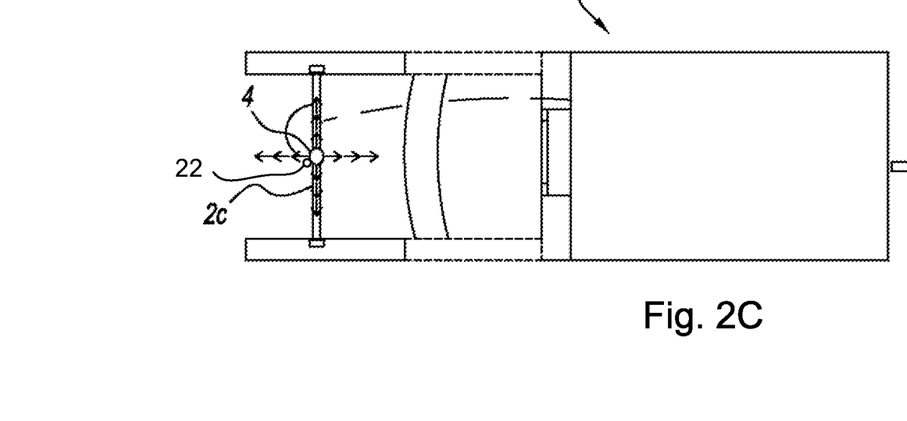
FIG. 2C is a top view drawing of another aspect of the apparatus in FIG. 1A according to an exemplary embodiment of the present disclosure.

FIGS. 1A-1C illustrate front, side, and top view drawings, respectively, of an apparatus for scanning and repairing three-dimensional road damage 20. Reference numbers referring to the same elements in different figures are used throughout the figures. Generally, as is shown in FIGS. 1-4, a transportation means 1, which according to one embodiment is a truck, has connected to a front end thereof a multidirectional positioning system 2 ("MPS"). The MPS 2 includes a pair of lateral rail bars 2a, which extend substantially parallel to each other in a forward direction from opposite sides of the truck. A first scanner 3, a cleaning head 30, a second scanner 3a, a scrubbing head 25 and a filling head 4 are attached to the MPS 2. The length of the first scanner 3 and the length of the second scanner 3a extend between the lateral rail bars 2a. The cleaning head 30 is connected to the MPS 2 between the first scanner 3 and the second scanner 3a and includes a marker 22 that marks a reference point 23, such as a painted dot, line or mark, on the three-dimensional road damage 20. The cleaning head 30 also includes a camera 30a for visual analysis of the three-dimensional road damage 20.

Figure 3:
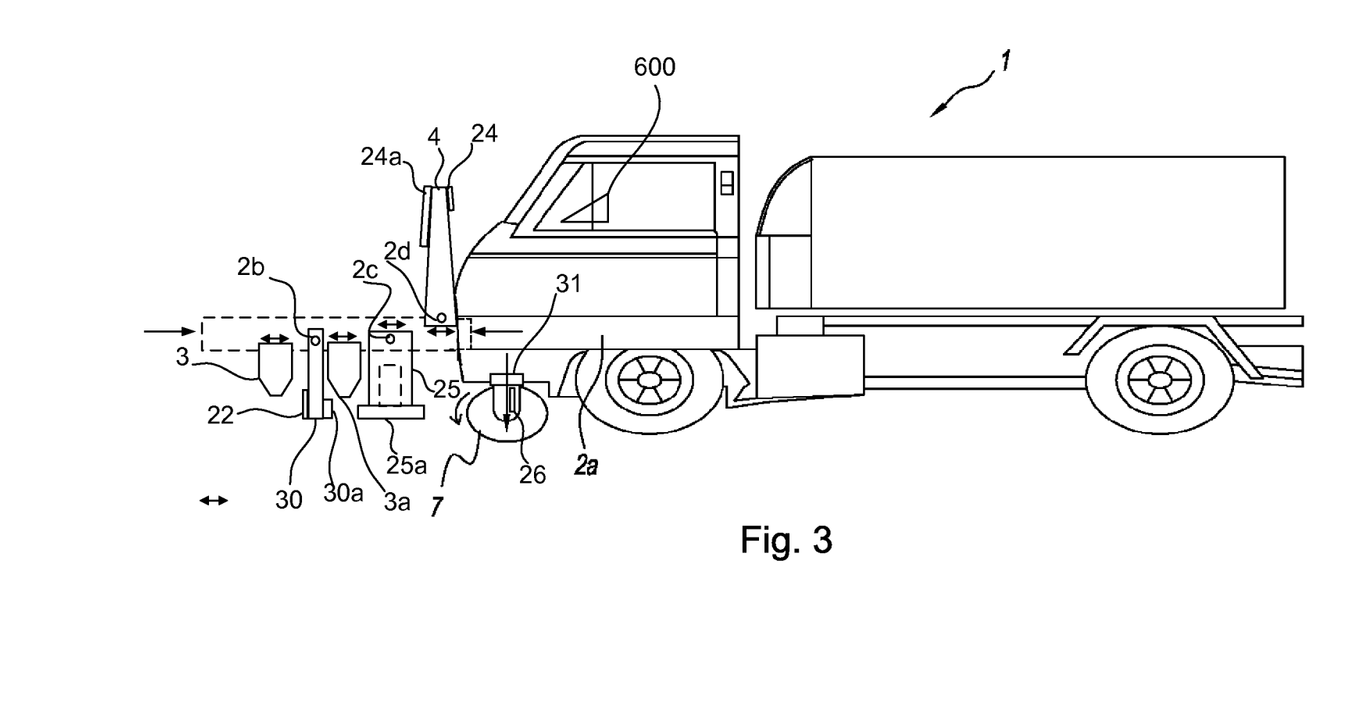
FIG. 3 is a side profile view drawing of another aspect of the apparatus in FIG. 1A according to an exemplary embodiment of the present disclosure.

The filling head 4 is connected to the MPS 2 at a front end of the transportation means 1 and is further connected to a supply conduit 5, which draws a filling material 21, such as concrete or asphalt, from a supply container 6 carried by the transportation means 1. A detector 24 for detecting the reference point 23 is mounted on the front of the filling head 4. The detector 24 may be an optical detector that uses an infrared emitted diode combined with an infrared phototransistor to detect the reflected infrared signal or any kind of detector known by a person having ordinary skill in the art. For example, if the transportation means 1 is disturbed or moved away from a current position, the transportation means 1 can be repositioned to the current position by detecting the reference point 23 via the detector 24. The detection of the reference point 23 via the detector 24 can be performed manually or automatically via software instructions executed by a processor 602 including processing circuitry inside an electronic control unit 600 ("ECU"). In addition, an injector 24a is mounted on the filling head 4 to spread liquid treatments such as acidic solutions or liquid sealants on the three-dimensional road damage 20. The scrubbing head 25 is placed between the second scanner 3a and the filling head 4 and includes a linear or rotating scrub brush 25a in order to remove irregularities around the three-dimensional road damage 20. The scrub brush 25a may have metallic hairs or bristles, or any abrasive surface capable of smoothing the surface of the three-dimensional road damage 20. FIG. 3 further depicts a heavy roller 7. The heavy roller 7 may be attached beneath the vehicle, for example, as shown in FIG. 3. However, the heavy roller 7 may be attached to a different location on the transportation means 1 so long as the heavy roller 7 can roll over the three-dimensional road damage 20 during repair thereof. A plurality of level detectors 26 may be mounted onto the transportation means 1 in order to measure the leveling, e.g., the cross and longitudinal slopes, around the three-dimensional road damage 20. In other words, the plurality of level detectors 26 may be used to measure how well the filled three-dimensional road damage 20 has been flattened by the heavy roller 7. The plurality of level detectors 26 may be affixed to the heavy roller 7 or to any other location on the transportation means 1 as long as the plurality of level detectors 26 is able to measure the leveling around the three-dimensional road damage 20. In addition, a vibrating mechanism 31 may be mounted on the heavy roller 7 to assist in flattening the three-dimensional road damage 20 after filling. The vibrating mechanism 31 may be produced by a free-spinning hydrostatic motor inside the heavy roller 7 connected to a shaft with an eccentric weight.

Regarding the specific components used to achieve the methods described herein, the transportation means 1, or truck, depicted in FIGS. 1A-3 is only one non-limiting embodiment of a transportation means 1 for the instant application. In another embodiment, the MPS may be a small portable machine, or the MPS may be separately affixed to any vehicle capable of supporting the MPS.

Figure 4:
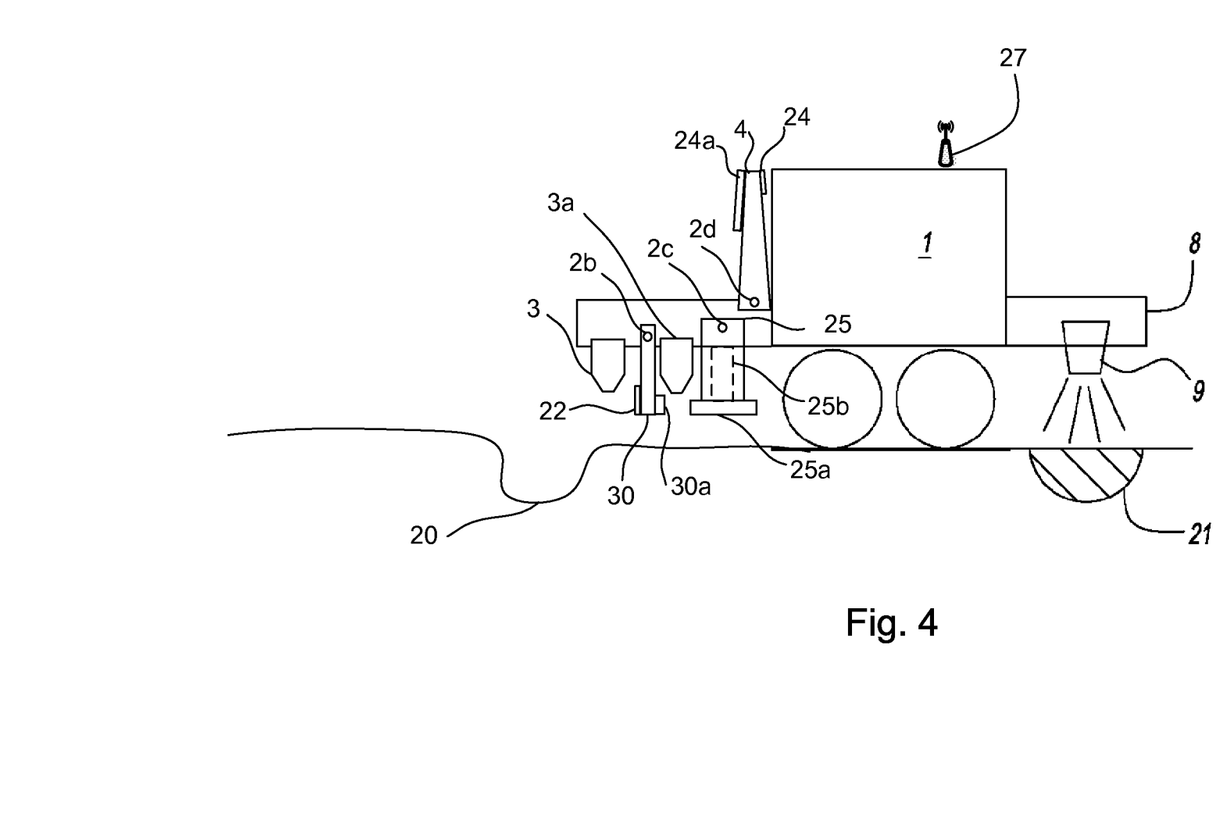
FIG. 4 is a schematic side view drawing of an alternative embodiment according to an exemplary embodiment of the present disclosure.

For example, the transportation means 1 can be an autonomous transport or a remotely controlled transport, such as a robot (FIG. 4). In particular, a specially configured robot can function as the transportation means 1, where "specially configured" means that the robot is particularly designed and programmed to perform repairs to the three-dimensional road damage 20 and can be outfitted with the repair components discussed previously, including the MPS 2, as well as others described herein below. For example, the robot may be equipped with the ECU 600 connected to the camera 30a and other sensors 618, such as the detector 24 and/or the plurality of level detectors 26. Using the above sensors, the robot can be programmed to autonomously seek and repair the three-dimensional road damage 20 based on received location restrictions and instructions. In addition, the robot can be controlled remotely via an operator guiding the robot to the three-dimensional road damage 20.

Other possible transportation means 1 may not be entirely mechanically driven. Thus, an alternative example of the transportation means 1 is a push cart that is manually movable, and able to power or support the first scanner 3, the second scanner 3a and, the cart itself.

As shown in FIG. 3, in one implementation, the MPS 2 includes a first pair of cross-rails 2b, a second pair of cross-rails 2c and a third pair of cross-rails 2d that extend between the lateral rail bars 2a. The cross-rail bars 2b, 2c, 2d are slidably movable along a length of the lateral rail bars 2a, as indicated in FIG. 3 by the double arrows placed on top of the cross-rail bars 2b, 2c, 2d. Further, the lateral rail bars 2a are simultaneously retractable, as indicated in FIG. 3 by the arrow facing in opposite directions with respect to the ends of the lateral rail bars 2a. The length of extension of the lateral rail bars 2a is substantially equidistant extending together anywhere from a first position to a second position. In the first position, the lateral rail bars 2a are secured along the side of the truck cab. In the second position, the lateral rail bars 2a are extended in front of the transportation means 1 to the fullest extension.

The first scanner 3 and the second scanner 3a are movable in a direction parallel to the lateral rail bars 2a, as indicated in FIG. 3 by the double arrows, and extend fully between the lateral rail bars 2a. Further, the first scanner 3 and the second scanner 3a are oriented so that the scanning portion of the first scanner 3 and the scanning portion of the second scanner 3a face the ground beneath the lateral rail bars 2a. Note that any known three-dimensional scanner may be attached to the MPS 2, so long as the three-dimensional scanner used provides satisfactory results for calculation purposes. The first scanner 3 and the second scanner 3a are able to obtain volume data associated with the three-dimensional road damage 20 in both numeric and image formats, so that the volume data can be processed by the processor 602 having a data storage memory 604 in the transportation means 1 and displayed on a monitor 614 for review by the operator, upon receipt of the volume data. Accordingly, the first scanner 3 and the second scanner 3a can be electrically connected to the processor 602 via a wired or wireless connection in order to transfer the volume data obtained by the first scanner 3 and the second scanner 3a.

The cleaning head 30 is connected slidingly to the first cross-rail bar 2b. As such, the cleaning head 30 is movable along the first cross-rail bar 2b in a direction orthogonal to the lateral rail bars 2a; and by way of the sliding interconnection between the first cross-rail bar 2b and the lateral rail bars 2a, the cleaning head 30 is also movable in a direction parallel to the lateral rail bars 2a. Accordingly, the cleaning head 30 is movable in at least two dimensions and can be positioned anywhere between the lateral rail bars 2a.

The scrubbing head 25 is affixed to the transportation means 1 in a similar way to the cleaning head 30. The scrubbing head 25 is connected to the second cross-rail bar 2c and can also be positioned anywhere between the lateral rail bars 2a. In addition, the scrub brush 25a is movable in the vertical direction by being pushed and retracted via a piston 25b inside the scrubbing head 25. As such, it is possible to press the scrub brush 25a on the top of the three-dimensional road damage 20 to clean the surface of the three-dimensional road damage. The scrubbing head 25, the scrub brush 25a and the piston 25b may be automatically actuated and/or controllable via the processor 602 in order to prepare and clean the surface around the three-dimensional road damage 20. Like the cleaning head 30 and the scrubbing head 25, the filling head 4 is connected to the third cross-rail bar 2d on a first end of the filling head 4, and the second end of the filling head 4 is connected to the supply conduit 5, which is connected to the supply container 6. Also like cleaning head 30 and the scrubbing head 25, the filling head 4 can be positioned anywhere between the lateral rail bars 2a. As such, the filling head 4 can be positioned over the three-dimensional road damage 20 to dispense, through a sprayer or an extruder, a predetermined quantity of filling material 21 based on the volume data obtained by the first scanner 3 and the second scanner 3a. The filling head 4 may be automatically actuated and/or controllable via the processor 602 based on the volume data obtained. An operator may also manually control the position of the filling head 4. In addition, the third cross-rail bar 2d can rotate around the length of the third cross-rail bar 2d, as indicated by the two circular arrows in FIG. 2b. Such a rotation enables the filling head 4 to move from an up position to a down position and from the down position to the up position. In the up position the filling head 4 is facing upward, as illustrated in dashed lines in FIG. 2b, while in the down position the filling head 4 is facing downward, as illustrated in solid lines in FIG. 2b. When the filling head 4 is in the up position, the first scanner 3, the cleaning head 30, the second scanner 3a, and the scrubbing head 25 can pass below the filling head 4. The third cross-rail bar 2d can also have an adjustable width so that the MPS 2 can be configured to repair damage on roads having variable lane widths. According to one implementation, the adjustable width of the third cross-rail bar 2d can accommodate lane widths from 8 feet to 15 feet.

Note, with respect to the electro-mechanical elements of the claimed apparatus, including the connections between the filling head 4, the first scanner 3, the second scanner 3a, the MPS 2, and the processor 602 either in the transportation means 1 or in a remote location, may be connected to control the various components via any known wired or wireless method that fulfills the above-stated purposes of transferring actuation commands and data transmission. Similar to FIGS. 1A-3, FIG. 4 depicts a transportation means 1, however, the transportation means 1 is a remotely controllable robot directed via positioning data received from a positioning system, such as global positioning system (GPS). Further, in an alternative embodiment, the remotely controllable robot transportation means 1 also supports a rear MPS 8 and a rear scanner 9. The rear MPS 8 allows the rear scanner 9 to perform a secondary scan of the area that was repaired in order to ensure that the repair is complete and avoid future problems. For example, the image obtained by the rear scanner 9 can be analyzed manually by the operator or automatically by the processor 602 via an algorithm. If the obtained image shows that the repair of the three-dimensional road damage 20 was inadequate and a small cavity remained, the operator of the transportation means 1 or the robot itself would be able to further repair the three-dimensional road damage 20.

Figure 5:
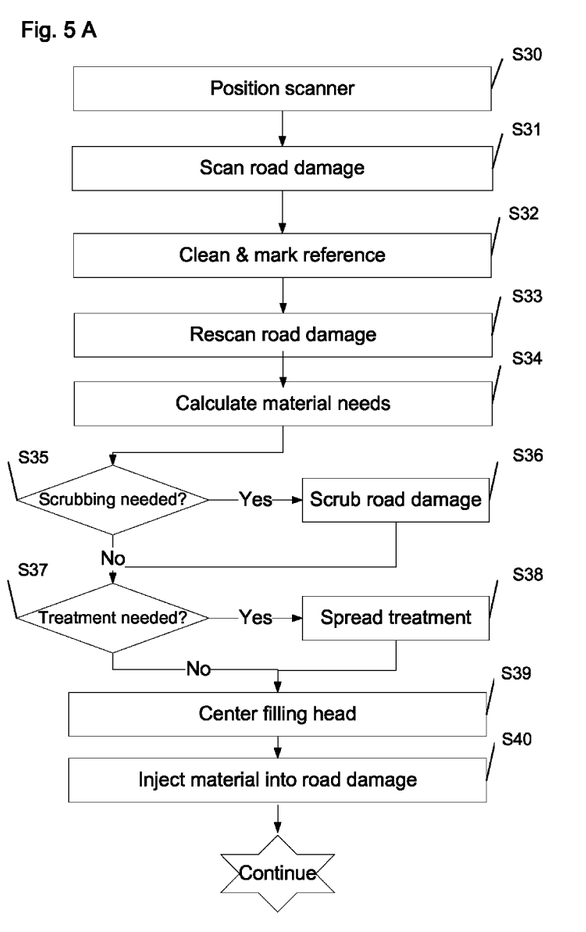
FIG. 5A is an exemplary flowchart of a method according to an exemplary embodiment of the present disclosure.
FIG. 5B is an exemplary flowchart of a method according to an exemplary embodiment of the present disclosure.
Figure 5B:
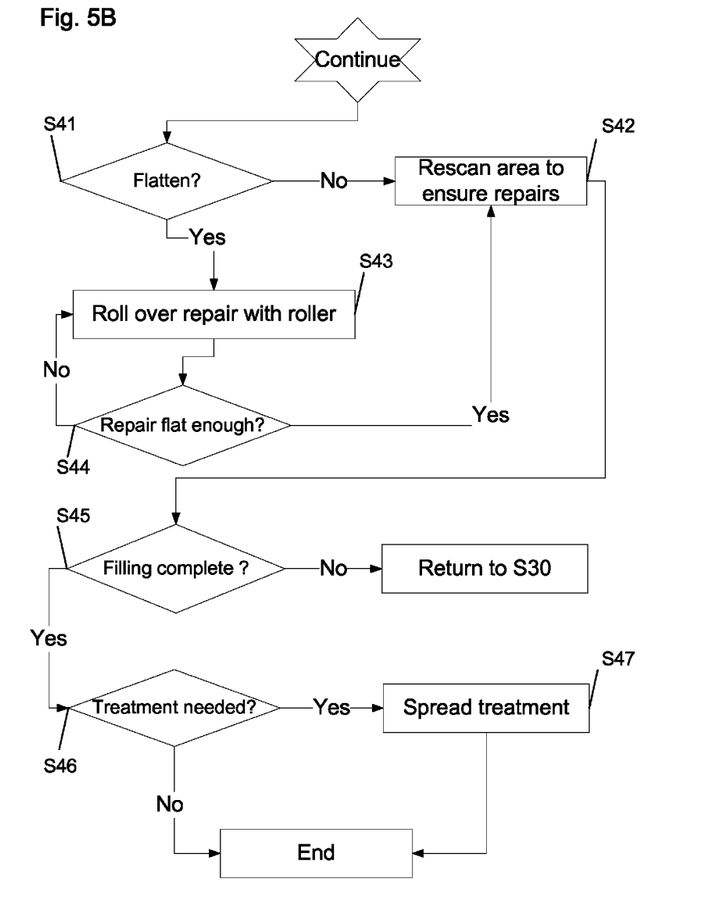

The general function of the components in the method of the application is as follows, and is depicted in FIGS. 5A and 5B. The transportation means 1 carries the supply container 6 to an area of a road surface containing the three-dimensional road damage 20, such as a pothole or other cavity.

In step S30, the transportation means 1 positions the MPS 2 over the three-dimensional road damage 20. The transportation means 1 is maneuvered to have the three-dimensional road damage 20 between the lateral rail bars 2a. The maneuvering of the transportation means 1 may be controlled manually or automatically via software instructions executed by the processor 602 including processing circuitry inside the ECU 600.

In step S31, the first scanner 3 scans the three-dimensional road damage 20 and the first scanner 3 may also capture a three-dimensional image thereof. The scanning of the three-dimensional road damage 20 is performed by moving the first scanner 3 along the lateral rail bars 2a at a predetermined constant speed and in a forward direction from the front of the transportation means 1. The movement of the scanner may be controlled manually or automatically via software instructions executed by the processor 602 including processing circuitry inside the ECU 600.

In step S32, the cleaning head 30 spreads a pressurized fluid, e.g. air or water, over the three-dimensional road damage 20 to clean, e.g., remove debris or dirt, the three-dimensional road damage 20. In addition, the marker 22 marks the three-dimensional road damage 20 with the reference point 23. For example, the marker 22 may be a paint sprayer to paint a painted dot, line or mark, on the three-dimensional road damage 20.

In step S33, the cleaned three-dimensional road damage 20 is scanned a second time by the first scanner 3 or by the second scanner 3a in order to for the circuitry of the ECU 600 to measure the three-dimensions of the road damage 20 i.e., the width, depth and length. The width, depth and length may be measured along three perpendicular axes intersecting at the reference point 23 and the three-dimensional image may be centered on the reference point 23.

In step S34, a measurement of the volume of the three-dimensional road damage 20 and an associated quantity of the filling material 21 is determined. The step S34 is performed by the processor 602 including processing circuitry inside the ECU 600, which uses the data from the first scanner 3 to calculate the quantity of filler material 21 to be added to the three-dimensional road damage 20. Details regarding the processor 602 and the ECU 600 are discussed further herein.

Note that in the step S34, the three-dimensional image of the three-dimensional road damage 20 may be generated by the processing circuitry of the ECU 600 and displayed on a monitor 614. For example, data points within the three-dimensional road damage 20 captured by the first scanner 3 may be converted via the processor 602 into a polygon mesh and then be represented via parametric computer-aided drafting models.

In step S35, it is determined if irregularities are present around the three-dimensional road damage 20 by the processing circuitry of the ECU 600 and if the irregularities are to be removed. For example, the processing circuitry can determine that irregularities having a size or volume greater than a predetermined threshold are to be removed. If it is determined by the processing circuitry that irregularities are present and are to be removed, the process goes to step S36. Otherwise, the process goes to step S37.

In step S36, the scrubbing head 25 with the scrub brush 25a scrubs the surface of the three-dimensional road damage 20. The linear or rotating motion of the scrub brush 25a is actuated and the scrub brush 25a is pressed against the top of the three-dimensional road damage 20 via the piston 25b. The linear or rotational motion of the hairs or bristles of the scrub brush 25a scrub the surface of the three-dimensional road damage 20 in order to have a clean surface of the three-dimensional road damage 20. The scrubbing head 25, the scrub brush 25a and the piston 25b may be automatically actuated and/or controllable via the processor 602 in order to scrub the surface around the three-dimensional road damage 20.

In step S37, it is determined if the surface of the three-dimensional road damage 20 should be treated via a liquid treatment to further clean it. For example, after scrubbing the surface of the three-dimensional road damage 20 some residues of grease or tar may be still present and the liquid treatment may be necessary to remove such residues and deeply clean the three-dimensional road damage 20. Step 37 may be performed manually or automatically via software instructions executed by the processor 602 including processing circuitry inside the ECU 600. For example, the presence of residues may be detected manually via the naked eye or automatically via image processing tools e.g. color intensity differences, image segmentations, edge detections or any other image processing tools known by a person having ordinary skill in the art. If it is determined that the surface of the three-dimensional road damage 20 should be treated, the process goes to step S38. Otherwise, the process goes to step S39.

In step S38, the injector 24a of the filling head 4 spreads a liquid treatment such as an acidic solution on the surface of the three-dimensional road damage 20 in step S38. Such a treatment may be used to deeply clean the three-dimensional road damage 20 and is controlled via software instructions executed by the processor 602 including processing circuitry of the ECU 600.

In step S39, the filling head 4 moves around the area of the three-dimensional road damage 20 until the detector 24 detects the reference point 23 in step S39. Step S39 may be performed manually or automatically via software instructions executed by the processing circuitry of the processor 602 in order to verify that the filling head 4 is positioned above the three-dimensional road damage 20 so that the detector 24 is centered on the reference point 23.

In step S40, the filling material 21 is injected or extruded on top of the reference point 23 in the three-dimensional road damage 20. The filling head 4 dispenses through a sprayer or an extruder the quantity of filling material 21 that have been determined in step S34 based on the volume data obtained by the first scanner 3.

In step S41, the operator determines whether flattening of the filled three-dimensional road damage 20 should be performed. If it is determined by the operator that the flattening of the filled three-dimensional road damage 20 should be performed, the process goes to step S43. Otherwise, the process goes to step S42.

In step S43, the heavy roller 7 is passed back and forth over the filled three-dimensional road damage 20 to flatten the filled three-dimensional road damage 20. The flattening of the filled three-dimensional road damage 20 in the step S43 can also be performed using vibrations generated by the vibrating mechanism 31.

In step S44, it is determined if a predetermined flatness criteria is met. For example, the predetermined flatness criteria for the surface of the filled three-dimensional road damage may be met when the plurality of level detectors 26 indicates a maximum fluctuation of inclination inside a perimeter of the three-dimensional road damage 20 less than a predetermined level threshold. Further, the predetermined level threshold may be a function of the volume of the three-dimensional road damage 20. Step S44 may be performed manually or automatically via software instructions executed by the processor 602 including processing circuitry inside the ECU 600. If it is determined that a predetermined flatness criteria is met, the process goes back to step S43. Otherwise, the process goes to step S42.

In step S42, the filled three-dimensional road damage 20 is rescanned via the second scanner 3a similarly to step S31. The scanning of the filled three-dimensional road damage 20 is performed by moving the second scanner 3a along the lateral rail bars 2a at a predetermined constant speed and in a forward direction from the front of the transportation means 1. The movement of the scanner may be controlled manually or automatically via software instructions executed by the processor 602 including processing circuitry inside the ECU 600.

In step S45, it is determined if the filling is completed through an analysis of an image of the filled three-dimensional road damage 20 scanned by the second scanner 3a or/and taken by the camera 30a of the cleaning head 30. The image of the filled three-dimensional road damage 20 may be displayed on the monitor 614 of the ECU 600 and be manually analyzed by the operator. The image analysis may also be performed automatically via software instructions executed by the processor 602 including processing circuitry inside the ECU 600. If it is determined that the filling is not completed, the process returns to step S30 to reiterate the whole process from the beginning. Otherwise, the process goes to step S46. In step S46, it is determined if a surface treatment of the filled three-dimensional road damage 20 is added to the process. A surface treatment of the filled three-dimensional road damage 20 may be selected if the filled three-dimensional road damage 20 undergoes a mechanical stress, due to weather fluctuations as well as traffic fluctuations, superior to a predetermined mechanical stress threshold. If a surface treatment of the filled three-dimensional road damage 20 is added to the process, the process goes to step S47. Otherwise the process is ended.

In step S47, the injector 24*a* spreads a liquid treatment on the filled three-dimensional road damage 20. The liquid treatment may be a sealant or any protection known by a person having ordinary skill in the art. In addition, an optional step of heating the three-dimensional road damage 20 through a heating head may be added between any steps mentioned above. The heating head comprises a hot air blower or a heating lamp or any element known by a person having ordinary skill in the art. This heating procedure may be used to heat the three-dimensional road damage 20 and remove moisture before filling or be used to maintain the viscosity of the filling material 21 low and make sure that the filling material 21 penetrates well the three-dimensional road damage 20.

Figure 6:
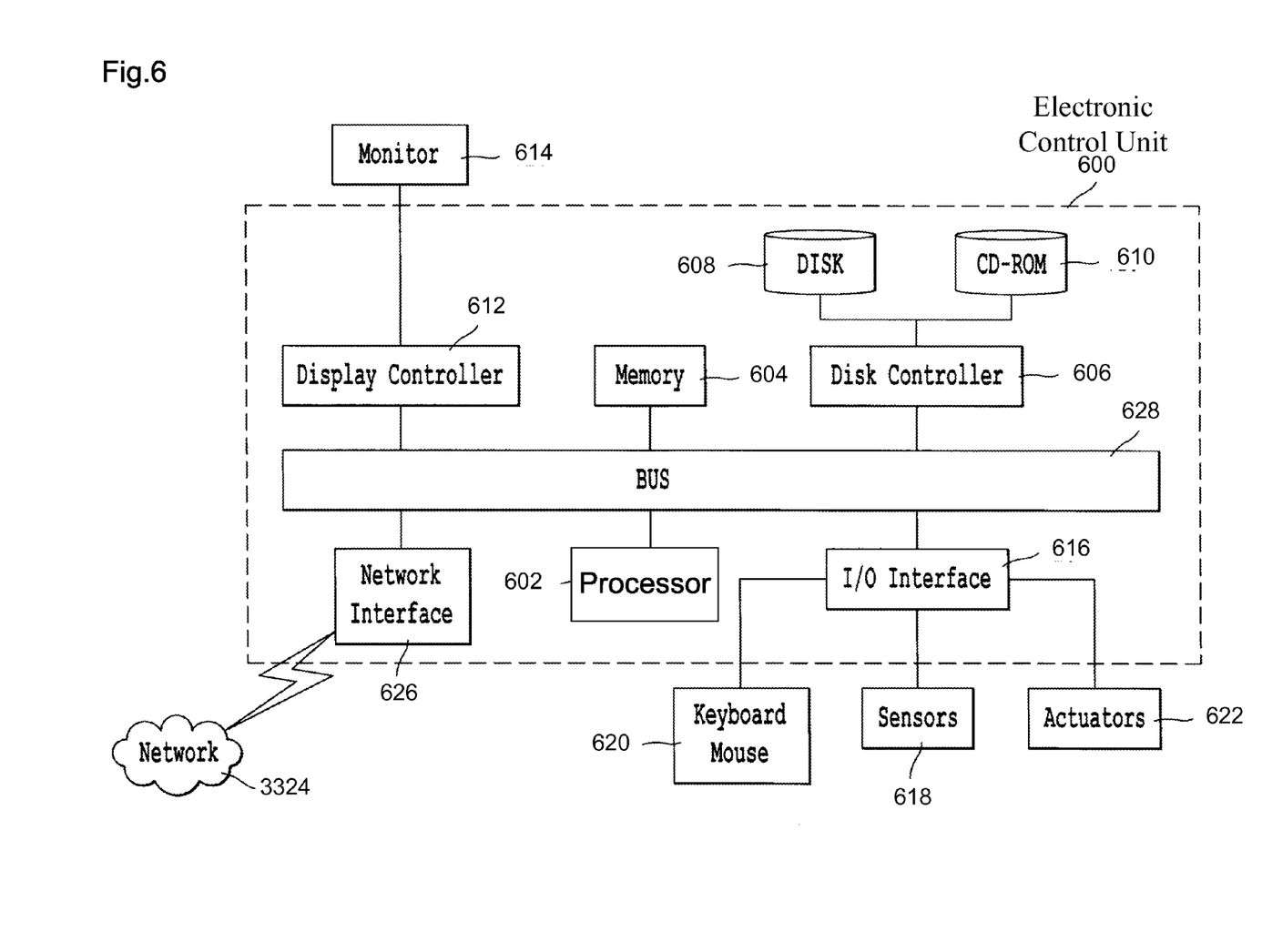
FIG. 6 is a schematic view of a hardware diagram of an illustrative electronic control unit for scanning and repairing road three-dimensional damage.

FIG. 6 depicts the ECU 600 for scanning and repairing the three-dimensional road damage 20. As shown in FIG. 6, systems, operations, and processes in accordance with this disclosure may be implemented using the processor 602 or at least one application specific processor (ASP). The processor 602 may utilize a computer readable storage medium, such as a memory 604 (e.g., ROM, EPROM, EEPROM, flash memory, static memory, DRAM, SDRAM, and their equivalents), configured to control the processor 602 to perform and/or control the systems, operations, and processes of this disclosure. Other storage mediums may be controlled via a controller, such as a disk controller 606, which may control a hard disk drive 608 or optical disk drive 610.

The processor 602 or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The processor 602 may be a separate device or a single processing mechanism. Further, this disclosure may benefit form parallel processing capabilities of a multi-cored processor. In another aspect, results of processing in accordance with this disclosure may be displayed via a display controller 612 to a monitor 614 that may be peripheral to or part of the ECU 600. Moreover, the monitor 614 may be provided with a touch-sensitive interface to a command/instruction interface. The display controller 612 may also include at least one graphic processing unit for improved computational efficiency. Additionally, the ECU 600 may include an I/O (input/output) interface 616, provided for inputting sensor data from sensors 618 and for outputting orders to actuators 622. The sensors 618 and actuators are illustrative of any of the sensors and actuators described in this disclosure.

Further, other input devices may be connected to the I/O interface 616 as peripherals or as part of the ECU 600. For example, a keyboard or a pointing device such as a mouse 620 may control parameters of the various processes and algorithms of this disclosure, and may be connected to the I/O interface 616 to provide additional functionality and configuration options, or to control display characteristics. Actuators 622 which may be embodied in any of the elements of the apparatuses described in this disclosure may also be connected to the I/O interface 616. The above-noted hardware components may be coupled to a network 624, such as the Internet or a local intranet, via a network interface 626 for the transmission or reception of data, including controllable parameters. A central BUS 628 may be provided to connect the above-noted hardware components together, and to provide at least one path for digital communication there between.

Obviously, numerous modifications and variations of the present invention are possible in light of the above teachings. It is therefore to be understood that within the scope of the appended claims, the invention may be practiced otherwise than as specifically described herein.

The invention claimed is:

1. An apparatus, comprising:
a multidirectional positioning system on a front of a vehicle and including a pair of lateral rail bars and cross-lateral rail bars extending between the lateral rail bars;
at least two scanner heads each attached to a cross-lateral rail bar and configured to scan a volume of three-dimensional road damage;
a cleaning head attached to the multidirectional positioning system between the at least two scanner heads and configured to clean the three-dimensional road damage by spreading a pressurized fluid over the three-dimensional road damage;
a scrubbing head attached to the multidirectional positioning system between one of the scanner heads and a filling head attached to the multidirectional positioning system, the scrubbing head being configured to remove irregularities from a surface of the three-dimensional road damage;
a processor having processing circuitry configured to determine a volume of the three-dimensional road damage based on volume data received from the at least two scanner heads and calculate an amount of filling material required to fill the three-dimensional road damage based on the volume data
wherein the filling head is controlled via the processor to move with respect to a shape of the three-dimensional road damage based on the volume data to fill in the three-dimensional road damage with the calculated amount of filling material.

2. The apparatus according to claim 1, wherein the cleaning head is connected to a first cross-lateral rail bar of the cross-lateral rail bars and is slidingly movable along a length of the first cross-lateral rail bar in a direction orthogonal to the lateral rail bars,
wherein the scrubbing head is connected to a second cross-lateral rail bar of the cross-lateral rail bars and is slidingly movable along a length of the second cross-lateral rail bar in a direction orthogonal to the lateral rail bars,
wherein the filling head is connected to a third cross-lateral rail bar of the cross-lateral rail bars and is slidingly movable along a length of the third cross-lateral rail bar in a direction orthogonal to the lateral rail bars, and
wherein the first, second and third cross-lateral rail bars are slidingly movable along a length of the lateral rail bars in a direction parallel to the lateral rail bars.

3. The apparatus according to claim 2, wherein the pair of lateral rail bars are configured to be fully extended away from the vehicle in a first position and wherein the pair of lateral rail bars are configured to be fully retracted at opposite sides of the vehicle in a second position.

4. The apparatus according to claim 1, further comprising:
a heavy roller attached to a surface of the apparatus and positioned between the multidirectional positioning system and front wheels of the vehicle and beneath the vehicle to roll across filled three-dimensional road damage.

5. The apparatus according to claim 4, wherein the processing circuitry is further configured to receive a maximum fluctuation of inclination from the at least two level detectors and verify that the maximum fluctuation of inclination does not exceed a predetermined level threshold.

6. The apparatus according to claim 5, wherein the heavy roller further includes a vibrating mechanism to flatten the filled three-dimensional road damage.

7. The apparatus according to claim 1, further comprising a supply container for holding the filling material used to fill the three-dimensional road damage via the filling head.

8. The apparatus according to claim 7, further comprising a material supply conduit extending from the supply container to the filling head to supply the filling material to the filling head.

9. The apparatus according to claim 1, further comprising:
a rear scanner connected to a second end of the vehicle opposite the first end to scan for gaps in a surface of the filling material deposited into the three-dimensional road damage.

10. The apparatus according to claim 1, wherein the filling head includes at least one of a sprayer and an extruder to dispense a filling material.

11. The apparatus according to claim 10, wherein the filling head further includes a detector to detect a reference point in the three-dimensional road damage and an injector to spread a liquid treatment, wherein the reference point is marked by a marker affixed to the cleaning head.

12. The apparatus according to claim 1, wherein
the multidirectional positioning system is connected to a remotely controllable transportation robot; and
the processing circuitry is further configured to issue control signals to direct movement of the remotely controllable transportation robot based on a position determination.

13. The apparatus according to claim 1, further comprising:
a heating head attached to the multidirectional positioning system to heat the three-dimensional road damage to remove moisture present in the three-dimensional road damage.

14. The apparatus according to claim 13, wherein the heating head includes a hot gas blower.

15. The apparatus according to claim 13, wherein the heating head includes a heating source.

16. A method, comprising:
positioning a first scanner over three-dimensional road damage using a multidirectional positioning system to which the first scanner is attached, the multidirectional positioning system being positioned on a front of a vehicle and having a pair of lateral rail bars configured to be extendable and retractable in parallel from the front of the vehicle and cross-lateral rail bars extending between the lateral rail bars;
scanning a volume of the three-dimensional road damage via the first scanner of the multidirectional positioning system;
cleaning a surface of the three-dimensional road damage by spreading a pressurized fluid through a cleaning head of the multidirectional positioning system;
marking the surface of the three-dimensional road damage with a reference point using a marker mounted on the cleaning head of the multidirectional positioning system;
generating, via processing circuitry, volume data of the three-dimensional road damage corresponding to the scanned volume;
calculating, via the processing circuitry, an amount of filling material to fill the three-dimensional road damage based on the scanned volume data of the three-dimensional road damage;
scrubbing the surface of the three-dimensional road damage via a scrub tool mounted on a scrubbing head of the multidirectional positioning system;
treating the surface of the three-dimensional road damage by spreading a liquid treatment via an injector mounted on a filling head of the multidirectional positioning system; and
injecting the calculated amount of filling material into the volume of the three-dimensional road damage, via a filling head of the of the multidirectional positioning system, based on the scanned volume data of the three-dimensional road damage; and
heating the three-dimensional road damage via a heating head including a heating source or a hot gas blower.

17. The method to claim 16, further comprising;
rolling over filled three-dimensional road damage with a heavy roller having a vibrating mechanism to flatten the filled three-dimensional road damage, wherein the heavy roller is positioned between the multidirectional positioning system and front wheels of the vehicle.

18. The method of claim 17, further comprising;
rescanning the filled three-dimensional road damage to determine that the three-dimensional road damage has been filled.

19. The method of claim 16, further comprising outputting a 3D image of the volume of the three-dimensional road damage to a display.

* * * * *